US009787395B2

(12) United States Patent
Chung et al.

(10) Patent No.: US 9,787,395 B2
(45) Date of Patent: Oct. 10, 2017

(54) CONTROL APPARATUS AND METHOD FOR MONITORING OPTICAL FIBER LINK

(71) Applicant: ELECTRONICS AND TELECOMMUNICATIONS RESEARCH INSTITUTE, Daejeon-si (KR)

(72) Inventors: Hwan Seok Chung, Daejeon-si (KR); Seung Hyun Cho, Daejeon-si (KR); Jong Hyun Lee, Daejeon-si (KR); Sang Soo Lee, Daejeon-si (KR); Chan Gyo Han, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/007,739

(22) Filed: Jan. 27, 2016

(65) Prior Publication Data
US 2016/0218801 A1 Jul. 28, 2016

(30) Foreign Application Priority Data

Jan. 27, 2015 (KR) .................. 10-2015-0013001

(51) Int. Cl.
*H04B 10/079* (2013.01)
*H04B 10/2575* (2013.01)
(Continued)

(52) U.S. Cl.
CPC . *H04B 10/07953* (2013.01); *H04B 10/25759* (2013.01); *H04B 10/50572* (2013.01); *H04B 10/50575* (2013.01); *H04B 10/564* (2013.01)

(58) Field of Classification Search
CPC ........ H04B 10/07953; H04B 10/07955; H04B 10/25752
See application file for complete search history.

(56) References Cited

U.S. PATENT DOCUMENTS 5,513,029 A * 4/1996 Roberts ................ H04B 10/035
359/333
6,816,681 B2 * 11/2004 Li ...................... H04J 14/0221
398/26
(Continued)

FOREIGN PATENT DOCUMENTS

JP 2006-304095 A 11/2006
KR 20070024115 A 3/2007
(Continued)

*Primary Examiner* — Dzung Tran
(74) *Attorney, Agent, or Firm* — Ladas & Parry LLP

(57) ABSTRACT

An optical fiber cable of a mobile fronthaul system based on a radio over fiber (RoF), which includes a control apparatus for monitoring an analog optical link according to an exemplary embodiment, may be monitored. The monitoring control apparatus may include an optical signal monitor to monitor an optical signal passing through an optical fiber cable, and a system controller to control the optical signal based on a result of the monitoring. The optical signal monitor may calculate an average optical power, carrier-to-noise ratio (CNR), and a size of a nonlinear component from an electrical signal, which has been acquired from the optical signal. Then, the optical signal monitor may control the calculated average optical power, CNR, and nonlinear component.

17 Claims, 8 Drawing Sheets

(51) Int. Cl.
*H04B 10/50* (2013.01)
*H04B 10/564* (2013.01)

(56) References Cited

U.S. PATENT DOCUMENTS

| | | | |
|---|---|---|---|
| 7,263,285 B2 * | 8/2007 | Adleman | H04B 10/079 |
| | | | 398/15 |
| 7,553,092 B2 | 6/2009 | Choi et al. | |
| 7,751,715 B2 | 7/2010 | Takami et al. | |
| 2007/0171515 A1 | 7/2007 | Kang et al. | |
| 2007/0286601 A1 * | 12/2007 | Takami | H04B 10/6931 |
| | | | 398/45 |
| 2009/0022489 A1 * | 1/2009 | Way | H04J 14/0204 |
| | | | 398/4 |
| 2012/0093522 A1 * | 4/2012 | Qi | H04B 10/2942 |
| | | | 398/174 |

FOREIGN PATENT DOCUMENTS

| | | |
|---|---|---|
| KR | 1020070095725 A | 10/2007 |
| KR | 10-0926806 B1 | 11/2009 |

\* cited by examiner

CONTROL APPARATUS AND METHOD FOR MONITORING OPTICAL FIBER LINK

CROSS-REFERENCE TO RELATED APPLICATION(S)

This application claims the benefit under 35 U.S.C. §119 (a) of Korean Patent Application No. 10-2015-0013001, filed on Jan. 27, 2015, in the Korean Intellectual Property Office, the entire disclosure of which is incorporated herein by reference for all purposes.

BACKGROUND

1. Field

The following description relates to an analog optical transmission, and more particularly, to a technology for monitoring performance of an optical communications system based on radio over fiber (RoF).

2. Description of the Related Art

As the use of mobile data through mobile devices increases, a current mobile communications system is being developed into a form of cloud base station, which includes: a digital unit (DU) that performs functions for digital signal processing and functions of a framer and a serializer; and a radio unit (RU) with functions of an antenna and an RF amplifier and a frame division function, etc. A cloud mobile fronthaul based on a radio over fiber (Rot) uses a method of transmitting an analog signal between the DU and the RU, thereby transmitting a mobile baseband signal. However, since the analog optical signal is transmitted between the DU and the RU, a signal performance is greatly affected by the following factors: nonlinear noise and a receiver's thermal noise, which occur during the interconversion between an electrical signal and an optical signal; clipping noise generated after a part of a signal is clipped; or a linear operation area of an electrical/optical element.

Korean Patent Publication No. 10-2007-0024115 discloses an optical module used in a RoF-based communications system, and more specifically, an optical module that transmits a high-frequency signal, input from the outside, without a loss to an optical element. However, the above-mentioned patent only prevents a high-frequency signal loss, but cannot solve various degradation problems described above.

SUMMARY

The purpose of the following description is to provide a control apparatus and method for monitoring an analog optical fiber link to simply check performance of an analog optical signal, so that in a RoF-based cloud mobile fronthaul system, degradation problems of an optical signal may be solved, which occur during the interconversion between an electrical signal and an optical signal.

In one general aspect, a control apparatus for monitoring an analog optical link monitors an optical fiber cable in a mobile fronthaul system based on a radio over fiber (RoF). The control apparatus includes: an optical signal monitor to monitor an optical signal passing through an optical fiber cable; and a system controller to control the optical signal based on a result of the monitoring. The optical signal monitor may convert, to an electrical signal, a part of optical power of uplink and downlink optical signals in the mobile fronthaul system, and calculate an average optical power, a carrier-to-noise ratio (CNR), and a size of a nonlinear component from the electrical signal. To this end, the optical signal monitor may measure a power of the electrical signal acquired through analog-to-digital conversion (ADC) and digital signal processing (DSP) to calculate the average optical power. The optical signal monitor may acquire a size and noise size thereof from the electrical signal through an analysis of a frequency domain signal by using a fast Fourier transform (FFT), and calculate the CNR and the nonlinear component based on the acquired size and noise size.

The system controller may check a quality of the optical signal based on an optical power, a CNR, and a size of a nonlinear component, which are calculated by the optical signal monitor, and control the optical signal so that the checked quality meets a preset standard. To this end, the system controller may amplify or attenuate the electrical signal to adjust an optical modulation index (OMI) of an output optical signal to control the optical power, and adjust a bias current of a laser included in an electrical-to-optical converter in the mobile fronthaul system to control the CNR and the size of a nonlinear component.

In another general aspect, a control apparatus for monitoring an analog optical link included in a mobile fronthaul system based on a ring network, which comprises a DU and two or more RUs, comprises two or more optical signal monitors to monitor uplink and downlink optical signals in the ring network; and a system controller to control a path of the uplink and downlink optical signals based on a result of the monitoring. The optical signal monitor may convert, to an electrical signal, a part of optical power of the uplink and downlink optical signals in the mobile fronthaul system, and calculate an average optical power, a carrier-to-ratio (CNR), and a size of a nonlinear component from the electrical signal. The system controller may in response to the optical signal monitor identifying a failure occurrence in an optical fiber cable among a plurality of optical fiber cables connecting two or more digital units (DUs), perform a path switching to control transmission paths of two or more radio units (RUs) to avoid the optical fiber cable with the failure.

In another general aspect, a control method of monitoring an analog optical link, which is included in a mobile fronthaul system based on radio over fiber (Rof), includes: monitoring an optical signal passing through an optical fiber cable; and controlling the optical signal based on a result of the monitoring. The monitoring of the optical signal passing through the optical fiber cable may include: converting, to an electrical signal, a part of optical power of uplink and downlink optical signals in the mobile fronthaul system; and calculating an average optical power, a carrier-to-noise ratio (CNR), and a size of a nonlinear component from the electrical signal.

The calculating of the average optical power, the carrier-to-noise ratio (CNR), and the size of the nonlinear component from the electrical signal may include measuring a power of the electrical signal to calculate the average optical power. The calculating of the average optical power, the carrier-to-noise ratio (CNR), and the size of the nonlinear component from the electrical signal may include: acquiring a size and noise size thereof from the electrical signal through an analysis of a frequency domain signal by using a fast Fourier transform (FFT); and calculating the CNR and the nonlinear component based on the acquired size and noise size. Then, the controlling of the optical signal based on the result of the monitoring may include: checking a quality of the optical signal based on an optical power, a CNR, and a size of a nonlinear component, which are calculated by the optical signal monitor, and controlling the optical signal so that the checked quality meets a preset standard.

Other features and aspects may be apparent from the following detailed description, the drawings, and the claims.

Figure 1:
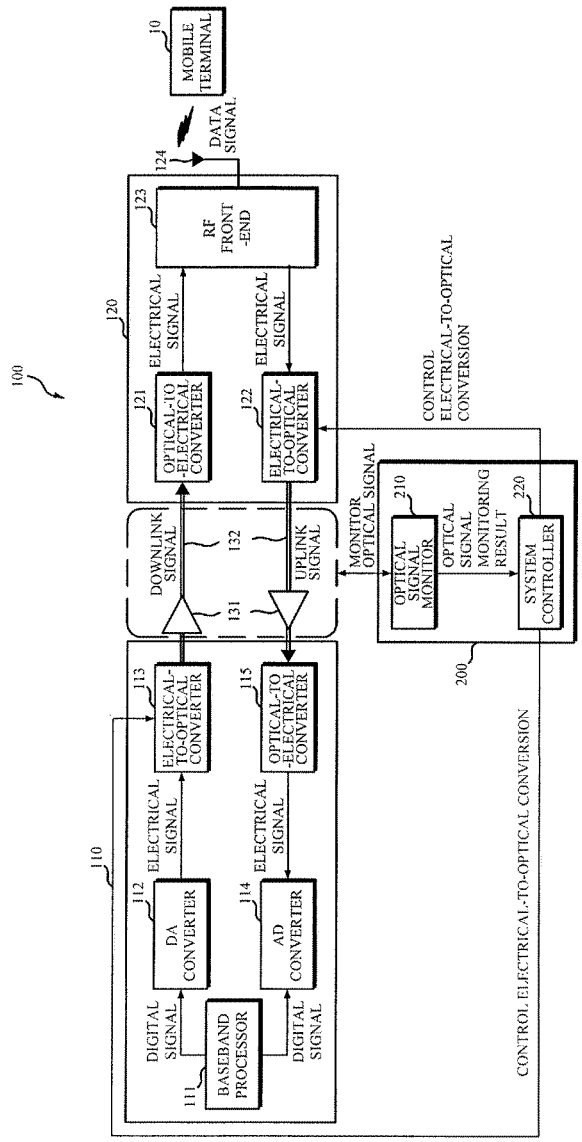
FIG. 1 is a diagram illustrating an example of a mobile fronthaul system having a control apparatus for monitoring an analog optical fiber link (hereinafter referred to as 'monitoring control apparatus') according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an example of a mobile fronthaul system 100 having a control apparatus 200 for monitoring an analog optical fiber link (hereinafter referred to as 'monitoring control apparatus 200') according to an exemplary embodiment.

Referring to FIG. 1, the mobile fronthaul system 100 having a monitoring control apparatus is based on a radio over fiber (RoF), and includes a digital unit (DU) 110, a radio unit (RU) 120, and a monitoring control apparatus 200. The DU 110 and the RU 120 transmits and receives an analog optical signal through optical fiber cables 132, and are connected to the optical fiber cables 132 including optical amplifiers 131 therebetween, which amplify an optical signal.

The DU 110 performs functions for digital signal processing and functions of a framer and a serializer in a RoF-based cloud mobile fronthaul. The DU 110 may be located indoors, or may have a form of large storage or cloud, which may flexibly change the amount to be processed according to traffic by combining one or more digital processing devices into one. The RU 120 performs functions of an antenna and an RF amplifier, and a preamble separation function. The RU 120 may be generally located outdoors, different from the DU 110.

A downlink signal transmission between the DU 110 and the RU 120 is as follows. First, the DU 110 converts a digital signal, which has been acquired through the baseband process by a baseband processor 111, to an analog electrical signal by using a digital-to-analog converter (DAC) in a DA converter 112. Then, an electrical-to-optical converter 113 electrically-to-optically converts the analog electrical signal and generates a downlink optical signal. The downlink optical signal generated in the DU 110 is transmitted to the RU 120 by passing through the optical amplifier 131 and the optical fiber cable 132. In the RU 120, an optical-to-electrical converter 121 optically-to-electrically converts the downlink optical signal, received from the DU 110 through the optical fiber cable 132, and then an RF front-end 123 performs an RF process on the converted signal, which is then transmitted wirelessly through an antenna 124. The RU 120 and a mobile terminal 10 may be connected wirelessly to each other through the antenna 124.

An uplink signal transmission is performed as opposed to the downlink transmission described above. In the RU 120, the RF front-end 123 mixes, into an intermediate frequency (IF), a data signal transmitted from the mobile terminal 10 to the antenna 124, and generates an electrical signal (RF signal). Then, an electrical-to-optical converter 122 adjusts an optical modulation index (OMI), converts the electrical signal to an optical signal through a laser, which is then transmitted to the DU 110 over the optical fiber cable 132. In the DU 110, an optical-to-electrical converter 115 converts a uplink optical signal, received from the RU 120, to an analog electrical signal; and an analog-to-digital (AD) converter 114 converts the analog electrical signal to a digital signal. Through this process, the RU 120 receives data from the mobile terminal 10, performs RF processes of changing its size, changing its frequency, and filtering, etc., which is then electrically-to-optically converted and transmitted to the DU 110 over the optical fiber cable 132. Then, the DU 110 optically-to-electrically converts the received optical signal to make an electrical signal, and processes a baseband signal through analog-to-digital conversion (ADC).

The mobile fronthaul system 100 having a control apparatus for monitoring an analog optical fiber link has a signal transmitted over the optical fiber cable 132, which is analog. Thus, signal degradation may occur due to a signal performance that is greatly affected by the following factors: nonlinear noise and thermal noise, which occur during the interconversion between an electrical signal and an optical signal; clipping noise generated after a part of a signal is clipped; or a linear operation area of an electrical/optical element. Accordingly, to control the signal degradation described above, the monitoring control apparatus 200 monitors optical signals, which are transmitted over the optical fiber cables 132 between the DU 110 and the RU 120, and controls the DU 110 and the RU 120 according to the monitoring result.

The monitoring control apparatus 200 includes an optical signal monitor 210 and a system controller 220. The optical signal monitor 210 monitors a downlink optical signal that is output from the DU 110, an uplink optical signal that is output from the RU 120, and optical signals in the optical amplifiers 131 and the optical fiber cables 132, so as to monitor the performance of an RoF signal and predict a performance degradation. Then, the optical signal monitor 210 monitors the optical signals between DU 110 and the RU 120, and measures the analog signal's optical power, carrier-to-noise ratio (CNR), and size for nonlinear noise. The optical signal monitor 210 transmits the monitoring result to the system controller 220.

Based on the optical monitoring result received from the optical signal monitor 210, the system controller 220 performs at least one control among a size control of RF signals, which are input to the optical converters 113 and 122, a bias control of the laser, a path change in an optical fiber cable, or an amplifier power control, so as to meet an optimum condition (which is set in advance) for stable operations of the mobile fronthaul system 100. Monitoring an optical signal and controlling electrical-to-optical conversion in the monitoring control apparatus 200 will be additionally described later with reference to FIGS. 2A, 2B, 3A, and 3B.

Figure 2A:
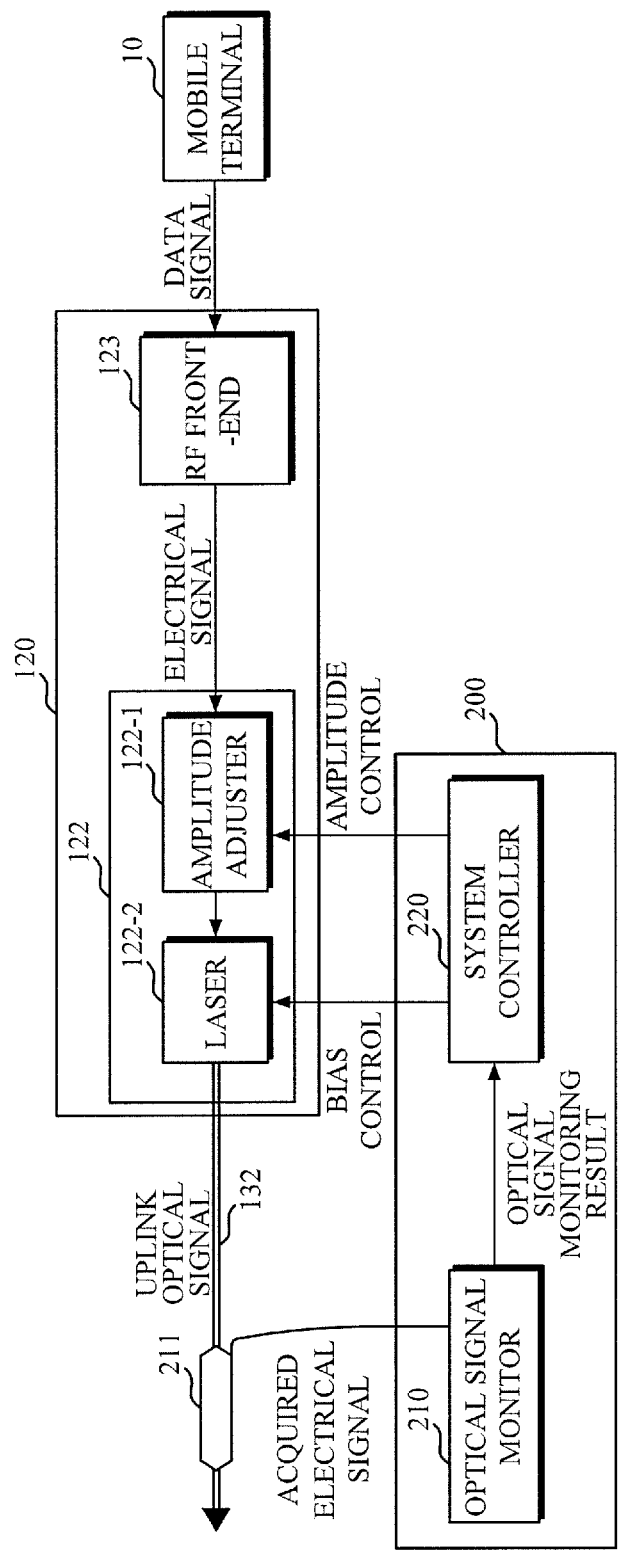
FIG. 2A is a diagram illustrating a control method of monitoring an uplink optical signal in a monitoring control apparatus according to an exemplary embodiment.

FIG. 2A is a diagram illustrating a control method of monitoring an uplink optical signal in a monitoring control apparatus 200 according to an exemplary embodiment.

Referring to FIGS. 1 and 2A, a control method for monitoring an uplink optical signal in a monitoring control apparatus 200 is as follows. In an RU 120, a data signal transmitted from a mobile terminal 10 is mixed into an intermediate frequency (IF) by an RF front-end 123, which is then input to an electrical-to-optical converter 122. Here, the signal input to the electrical-to-optical converter 122 is an RF signal, which is a form of an electrical signal. An amplitude adjuster 122-1 of the electrical-to-optical converter 122 amplifies or attenuates the received RF signal and adjusts an optical modulation index (OMI) of the output optical signal. The OMI is acquired after a root mean square (RMS) optical power, which changes by the RF signal, is divided by an average optical power. Then, the signal adjusted at the amplitude adjuster 122-1 is converted to an optical signal at a laser 122-2, which is then transmitted to the DU 110 over the optical fiber cable 132.

The optical signal monitor 210 checks a condition of the uplink optical signal, which is transmitted from the RU 120 to the DU 110 over the optical fiber cable 132, by using an optical detection instrument 211 included in a monitoring control apparatus 200. The optical detection instrument 211 included in the optical signal monitor 210 is one of the examples, and may include a photodetector and a tap coupler. The optical detection instrument 211 of the optical signal monitor 210 receives a part of the optical power of the optical fiber cable 132, and optically-to-electrically converts the received optical power through the photodetector, thereby acquiring an electrical signal, which is then transmitted to the optical signal monitor 210.

The optical monitor 210 calculates an average optical power, CNR, and a size of nonlinear component from the electrical signal that has been acquired from the optical signal by the optical detection instrument 211 through ADC and digital signal processing (DSP).

The optical signal monitor 210 measures an average RF power of the acquired electrical signal to calculate an average optical power. The optical monitor 210 acquires a signal size and a noise size through an analysis of a frequency domain signal by using a fast Fourier transform (FFT), and based on the acquired signal and its noise size, calculates the CNR and the nonlinear component. The optical signal monitor 210 transmits, to the system controller 220, the optical signal monitoring result including the average optical power, the CNR, and the nonlinear component, which have been calculated from the acquired electrical signal.

The system controller 220 checks a condition (quality) of the uplink optical signal based on the average optical power, the CNR, and a size of the nonlinear component, which are included in the received optical signal monitoring result. Then, the system controller 220 amplifies or attenuates the signal through the amplitude adjuster 122-1 and controls the bias of the laser 122-2, so that the uplink optical signal meets a preset standard (the optical signal quality). The system controller 220 amplifies or attenuates the received electrical signal (the RF signal illustrated in FIG. 2A) through the amplitude adjuster 122-1 and then adjusts an optical modulation index (OMI) of an output optical signal, thereby adjusting the optical signal. Then, the system controller adjusts the bias current of the laser 122-2 to adjust the CNR and the size of the nonlinear component. The control process or the system controller 220 will be additionally described later with reference to FIGS. 3A and 3B.

FIG. 2A is a diagram illustrating a control method of monitoring a downlink optical signal in a monitoring control apparatus according to an exemplary embodiment.

Figure 2B:
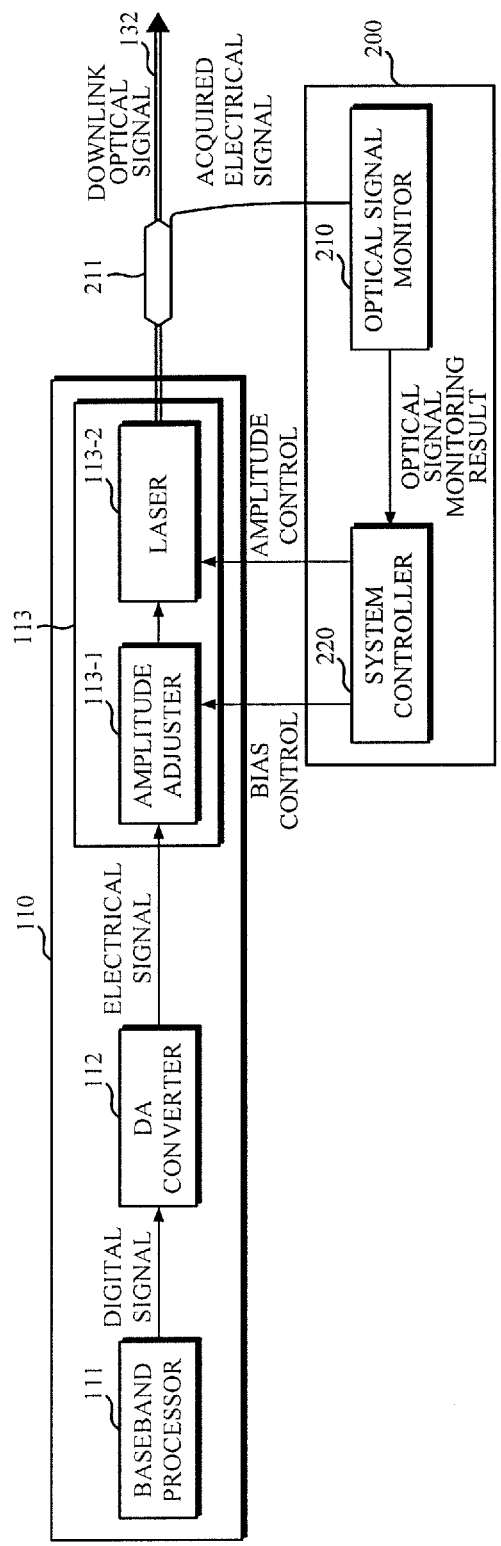
FIG. 2B is a diagram illustrating a control method of monitoring a downlink optical signal in a monitoring control apparatus according to an exemplary embodiment.

Referring to FIGS. 1 and 2B, the control method of monitoring a downlink optical signal is as follows. A digital signal, which has been acquired after a baseband process at a baseband processor 111 of a DU 110, is converted to an analog electrical signal through the digital-to-analog conversion (DAC) at a DA converter 112. The electrical signal, which has been acquired after the conversion at the DA converter 112, is transmitted to an amplitude adjuster 113-1 of an electrical-to-optical converter 113. The amplitude adjuster 113-1 amplifies or attenuates the received electrical signal, and then adjusts the OMI of an output optical signal. The OMI is acquired after dividing, by an average optical power, an RMS optical power that changes by an electrical signal. Then, the signal adjusted at the amplitude adjuster 113-1 is converted to an optical signal at a laser 113-2, which is then transmitted to a RU 120 through an optical fiber cable 132.

The optical signal monitor 210 checks a condition of the downlink optical signal, which is transmitted from the DU 110 to the RU 120 through the optical fiber cable 132 by using the optical detection instrument 211. The optical detection instrument 211 receives a part of the optical power of the optical fiber cable 132, and optically-to-electrically converts the received optical power through the photodetector, thereby acquiring an electrical signal, which is then transmitted to the optical signal monitor 210. The optical signal monitor 210 calculates the average optical power, the CNR, and the size of the nonlinear component from the electrical signal that has been acquired from the optical signal by the optical detection instrument 211. Then, the optical signal monitor 210 transmits, to the system controller 220, an optical signal monitoring result including the average optical power, the CNR, and the nonlinear component, which have been calculated from the acquired electrical signal. The system controller 220 controls the electrical-to-optical converter 113 based on the optical signal monitoring result that has been received from the optical signal monitor 210, thereby adjusting the optical signal. The system controller 220 checks the condition of the downlink optical signal based on the average optical power, the CNR, and the nonlinear component, which are included in the received optical signal monitoring result. Then, the system controller 220 amplifies or attenuates the signal through the amplitude adjuster 113-1 to adjust the optical power, so that the downlink optical signal meets a preset standard (the optical signal quality). In addition, the system controller 220 adjusts the bias current of the laser 122-2 to adjust the CNR and the size of the nonlinear component.

Figure 3A:
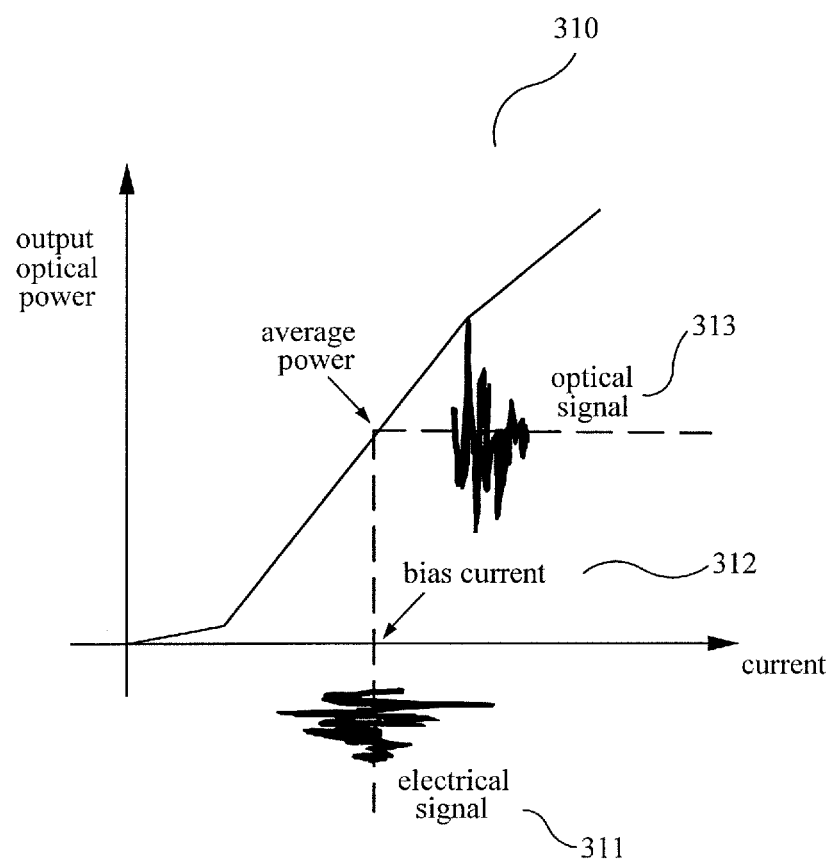
FIGS. 3A and 3B are diagrams for the description of an electrical-to-optical conversion control by a monitoring control apparatus according to an exemplary embodiment.
Figure 3B:
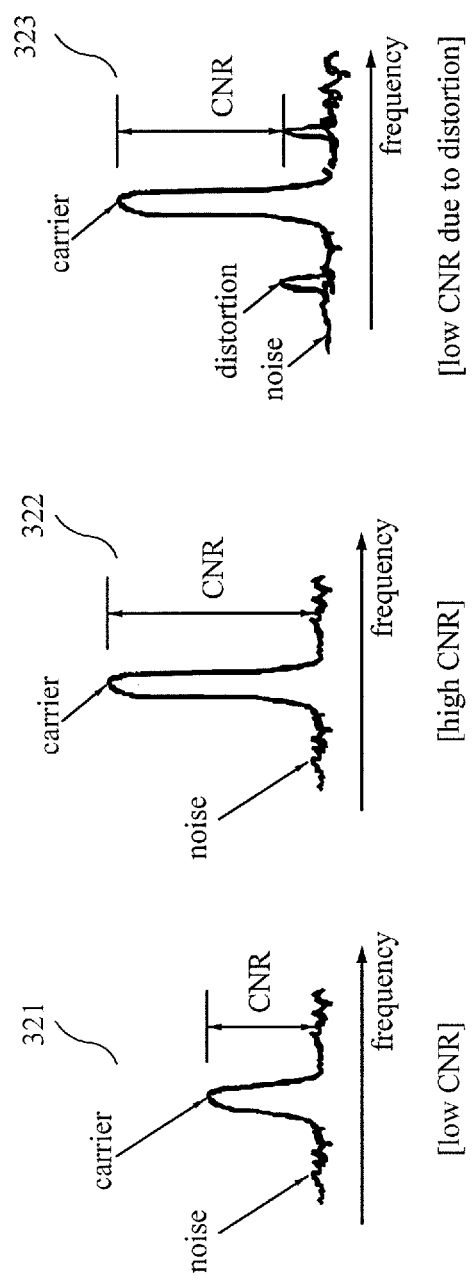

FIGS. 3A and 3B are diagrams for the description of an electrical-to-optical conversion control by a monitoring control apparatus according to an exemplary embodiment.

Referring to FIGS. 3A and 3B, FIG. 3A is a graph 310 showing a characteristic of electrical-to-optical conversion by an optical-to-electrical converter. The optical-to-electrical converter according to an exemplary embodiment converts a data signal, which is an electrical signal, to an optical signal and transmits the optical signal through an optical fiber cable. To this end, the optical-to-electrical converter changes a bias current 312 of a laser according to a size of an electrical signal 311 and generates an optical signal 313. Here, if the type of the bias current of the laser has a value which is within a predetermined range (a, b), a size of an output optical signal increases proportionally to the input electrical signal FIG. 3B is a graph for the description of a relation between a bias current value and an electrical signal. With reference to a graph for a low CNR in FIG. 3B, if compared to a set bias current value, a size of the electrical signal input to the optical-to-electrical converter is small, a size of a carrier in an RF spectrum of the optical signal is reduced, thereby reducing the CNR. The CNR is required to be high so as to maintain a good quality of transmission. Thus, the size of an input RF signal is required to be increased, or the bias current is required to be lowered. However, for the low bias current, an average optical power is reduced as illustrated in FIG. 3A. Thus, there are difficulties in outputting the optical power proportional to the electrical signal although the RF signal is input. With reference to a graph 323 for a low CNR due to distortion in FIG. 3B, if the size of the input signal is increased, electrical-to-optical conversion characteristic of a laser is nonlinear, which leads to the generation of the nonlinear distortion component, thereby causing a reduction in the CNR. Accordingly, a monitoring control apparatus controls an amplitude of the electrical-to-optical converter and a bias of a laser included therein, so that an average optical power, a nonlinear distortion component, and the CNR may meet a preset standard (an optical signal quality) range.

$$CNR(dB)=-20 \log_{10}(EVM/100\%) \quad \text{[Equation 1]}$$

Equation 1 refers to a relation between the error vector magnitude (EVM) showing a performance of a data signal and the CNR of an analog optical signal. The EVM is a value to show a performance of a digital signal that is modulated through inverse quantization (IQ), and presents how far the digital signal is away from its ideal location when being shown in a constellation diagram. A standard value of the EVM may change according to types of the digital signal. In a mobile fronthaul system 100 having a monitoring control apparatus 200 according to an exemplary embodiment, since an analog optical signal is transmitted over a link (an optical fiber cable), an optical signal monitor 210 is not capable of directly calculating the performance of the digital signal. However, the optical signal monitor 210 may calculate the CNR, thereby calculating a performance of a baseband digital signal by using Equation 1.

Figure 4:
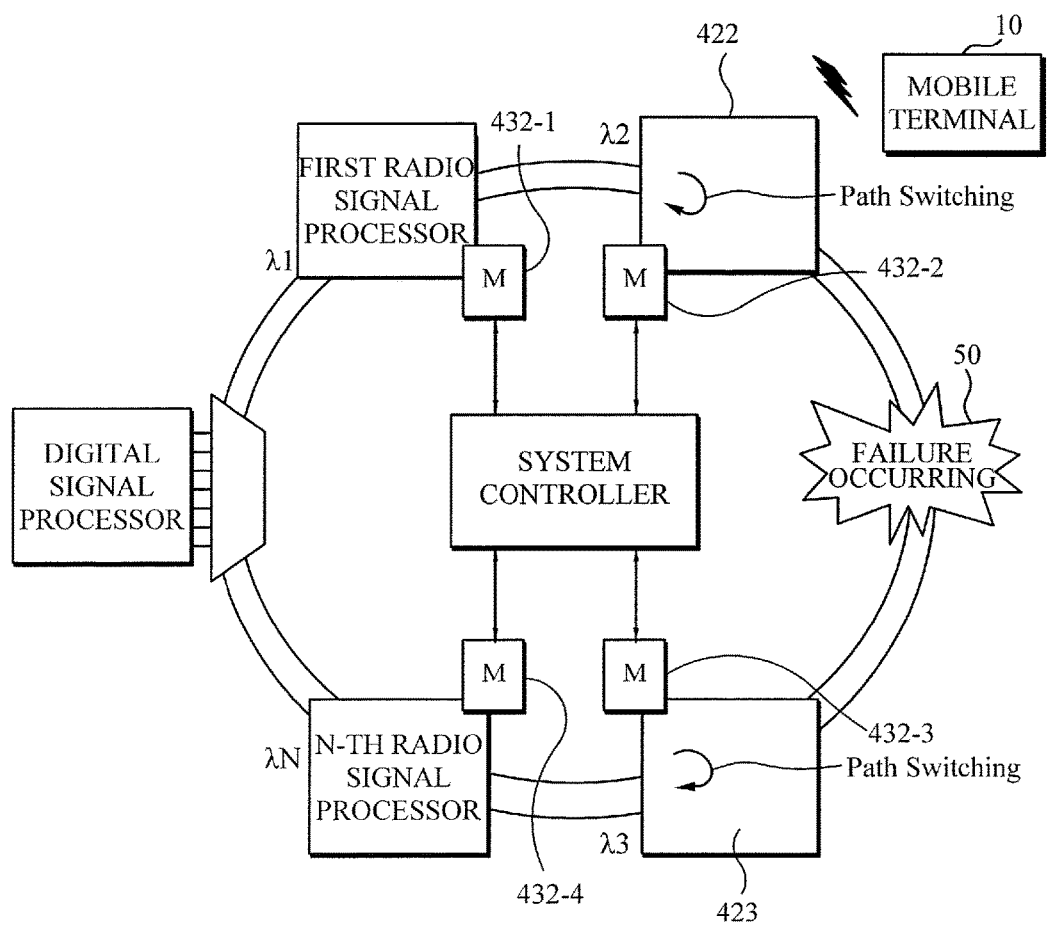
FIG. 4 is a diagram illustrating an example of a mobile fronthaul system based on a ring network, which includes a monitoring control apparatus according to an exemplary embodiment.

FIG. 4 is a diagram illustrating an example of a mobile fronthaul system based on a ring network, which includes a monitoring control apparatus according to an exemplary embodiment.

Referring to FIG. 4, different from FIG. 1 illustrating a mobile fronthaul system 100 having a monitoring control apparatus, a mobile fronthaul system 400 in FIG. 4 is based on a ring network. The ring network-based mobile fronthaul system 400 having a monitoring control apparatus 430 includes one or more RUs, which are connected to each other in the form of a ring (circle). In the example of FIG. 4, a basic transmission direction of a downlink optical signal is assumed to be clockwise for convenience of description.

A DU 410 converts a digital signal, acquired through a baseband process, to an optical signal by using the processes of DAC and optical-to-electrical conversion, and transmits this optical signal, i.e., a first downlink optical signal $\lambda 1$, to a first RU 421. The transmitted first downlink optical signal $\lambda 1$ is branched at the first RU 421. The first RU 421 combines the signal by using the first downlink optical signal $\lambda 1$ so as to transmit an uplink signal again, and transmits an uplink optical signal $\lambda 2$ clockwise to communicate with the DU 410. The uplink optical signal $\lambda 2$ in the RU 421 may be transmitted clockwise to the DU 410 over an optical fiber cable. All RUs including second, third to n-th RUs 422, 423 to 424, which are connected to the DU 410 in the form of a ring network, transmit the uplink signal clockwise in the same way as the first RU 421.

The monitoring control apparatus 430 includes: a system controller 431 that controls optical signals of one or more RUs based on the monitoring result from the optical signal monitor; and one or more optical signal monitors 432-1 to 432-4 that each monitor the one or more RUs. The one or more optical signal monitors 432-1 to 432-4 monitor the optical signals $\lambda 1$ to $\lambda N$ of the first RU 421 to N-th RU 424. The processes, in which the one or more optical monitors 432-1 to 432-4 monitor the optical signals $\lambda 1$ to $\lambda N$, are the same as the processes of FIGS. 1 to 2B.

For example, if a failure (the performance degradation, e.g., disconnection or CNR reduction) is assumed to occur in the optical cable 50 between the second RU 422 and the third RU 423, a third optical signal monitor 432-3 in the third RU 423 may monitor the failure occurrence of the optical fiber cable 50.

When receiving a notification of the failure occurrence in the optical fiber cable 50 from the third optical signal monitor 423-3, the system controller 431 controls the paths of the DU 410 and the second RU 421, thereby controlling the optical signals $\lambda 1$ and $\lambda 2$ to communicate with the DU 410 counterclockwise through a different optical fiber cable and performing path switching. Also, the system controller 431 controls the paths of the third RU 423 to the n-th RU 424 so that the optical signals $\lambda 3$ to $\lambda N$ are transmitted over a different optical fiber cable, wherein a downlink transmission is transmitted clockwise, and an uplink transmission is transmitted counterclockwise. Accordingly, the system controller 431 enables the uplink or downlink optical signal to be transmitted or received, not using the optical fiber cable where the failure has occurred.

Figure 5A:
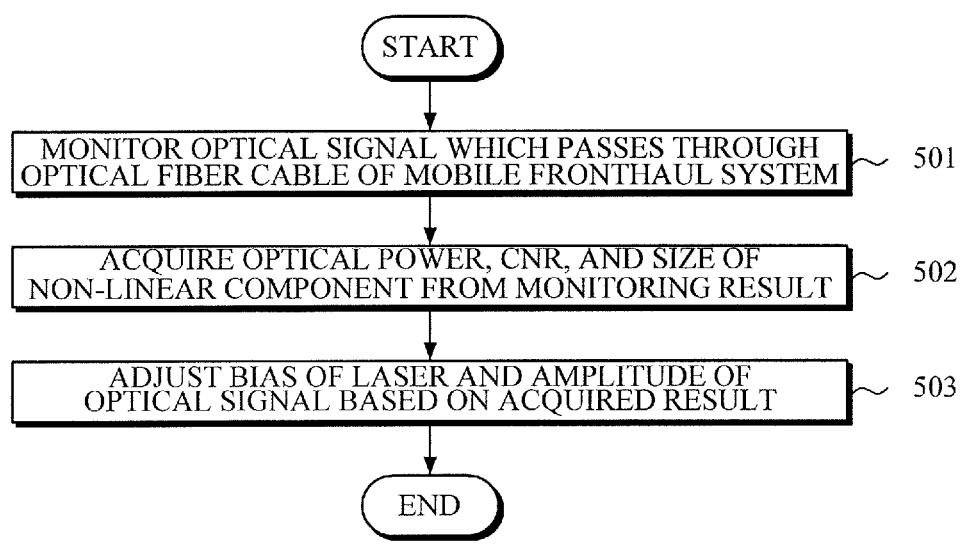
FIG. 5A is a flowchart illustrating a monitoring control method according to an exemplary embodiment.

FIG. 5A is a flowchart illustrating a monitoring result acquisition method of a monitoring control method according to an exemplary embodiment.

Referring to FIG. 5A, a monitoring control apparatus monitors an optical signal passing through an optical fiber cable in a mobile fronthaul system in 501. An RoF-based mobile fronthaul system transmits uplink and downlink optical signals between a DU and an RU through the optical fiber cable. The monitoring control apparatus separate a part of an optical power of the optical signal that passes through the optical fiber cable, by using an optical detection instrument, such as a tap coupler and a photodetector, and converts the separated part to an electrical signal.

If an electrical signal is generated when the optical fiber cable is monitored, the monitoring control apparatus calculates an optical power, CNR, and a size of a nonlinear component from the electrical signal, i.e., the monitoring result in 502. The monitoring control apparatus calculates an average optical power, CNR, and a size of a nonlinear component from the electrical signal that has been acquired through ADC and DSP.

Next, the monitoring control apparatus adjusts a bias of a laser and an amplitude of the optical signal based on the result from the optical signal in 503. The monitoring control apparatus checks a condition of the uplink optical signal based on the average optical power, the CNR, and the nonlinear component, which are included in the received optical signal acquisition result. Then, the system controller 220 amplifies or attenuates the optical signal through an amplitude adjuster so that the uplink optical signal meets a preset standard (an optical signal quality), and controls the bias of the laser. The control method of the monitoring control apparatus may be the same as the processes of FIGS. 3A and 3B described above.

Figure 5B:
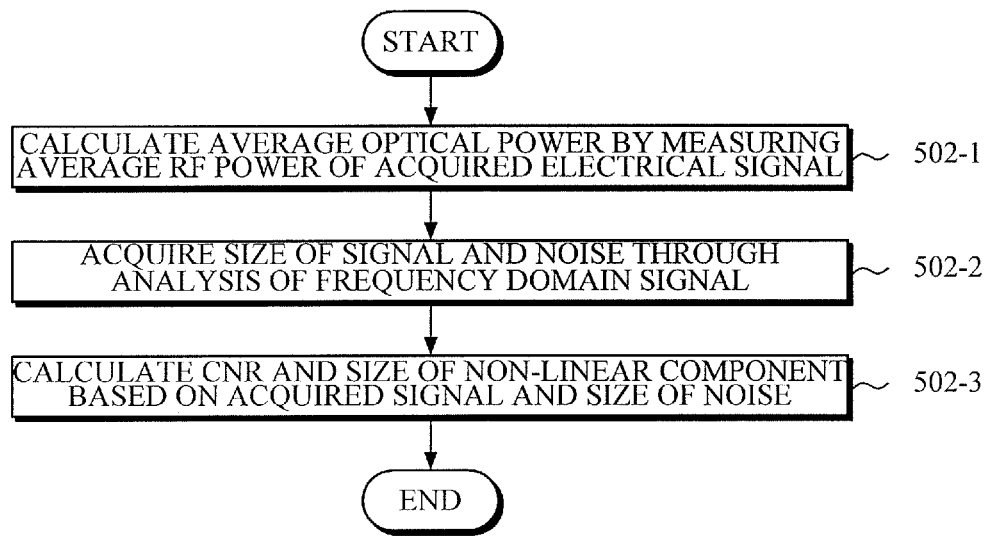
FIG. 5B is a flowchart illustrating a detailed process for a monitoring result acquisition method of a monitoring control method according to an exemplary embodiment.

FIG. 5B is a flowchart illustrating a detailed process for a monitoring result acquisition method of a monitoring control method according to an exemplary embodiment.

Referring to FIGS. 5A and 5B, a monitoring result acquisition method of a monitoring control method includes calculating an average optical power from an electrical signal converted from an acquired optical signal in 502-1. An optical signal passing through an optical fiber cable is branched by a tap coupler, which may be acquired as an electrical signal by a photodetector. The monitoring control apparatus may calculate an average optical power by measuring an RF power of the electrical signal. Then, the monitoring control apparatus analyzes the electrical signal and acquires a signal size and a noise size in 502-2. After the calculation of the average optical power, the monitoring control apparatus acquires the signal size and the noise size through an analysis of a frequency domain signal by using a fast Fourier transform (FFT). Then, based on the acquired signal size and noise size, CNR and a nonlinear component are calculated in 502-3. The monitoring control apparatus may check a quality of the optical signal passing through the optical fiber cable by using the average optical power, the CNR, and the size of the nonlinear component, which have been acquired through the above-mentioned processes, thereby controlling the optical signal to meet a preset signal quality.

A monitoring control apparatus and method according to an exemplary embodiment may simply measure a performance of an analog optical signal to secure a stable operation for a communications network in a mobile fronthaul system having the monitoring control apparatus and method. Particularly, the monitoring control apparatus and method quickly checks and adjusts the following factors: nonlinear noise and a receiver's thermal noise, which occur during the interconversion between an electrical signal and an optical signal; clipping noise generated after a part of a signal is clipped; and a nonlinear operation area of an electrical element or an optical element, thereby securing a quality of a stable optical signal.

The methods and/or operations described above may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A control apparatus for monitoring an analog optical link, the control apparatus comprising:
an optical signal monitor configured to monitor an optical signal passing through an optical fiber cable; and
a system controller configured to control the optical signal based on a result of the monitoring,
wherein the optical signal monitor is configured to convert, to an electrical signal, a part of optical power of uplink and downlink optical signals, and calculate at least one of an average optical power and a carrier-to-noise ratio (CNR) from the electrical signal.

2. The control apparatus of claim 1, wherein the optical signal monitor is further configured to calculate a size of a nonlinear component from the electrical signal.

3. The control apparatus of claim 2, wherein the optical signal monitor is configured to measure a power of the electrical signal acquired through analog-to-digital conversion (ADC) and digital signal processing (DSP) to calculate the average optical power.

4. The control apparatus of claim 2, wherein the optical signal monitor is configured to acquire a size and noise size thereof from the electrical signal through an analysis of a frequency domain signal by using a fast Fourier transform (FFT), and calculate the CNR and the nonlinear component based on the acquired size and noise size.

5. The control apparatus of claim 1, wherein the optical signal monitor is configured to calculate a performance of a digital signal by using an equation of $CNR(dB)=-20 \log 10(EVM/100\%)$, where CNR refers to the CNR of the acquired optical signal, and EVM refers to an error vector magnitude and a performance of a modulated digital signal.

6. A control apparatus for monitoring an analog optical link, the control apparatus comprising:
an optical signal monitor configured to monitor an optical signal passing through an optical fiber cable; and
a system controller configured to control the optical signal based on a result of the monitoring,
wherein the system controller is configured to check a quality of the optical signal based on an optical power, a CNR, and a size of a nonlinear component, which are calculated by the optical signal monitor, and control the optical signal so that the checked quality meets a preset standard.

7. The control apparatus of claim 6, wherein the system controller is configured to amplify or attenuate the electrical signal to adjust an optical modulation index (OMI) of an output optical signal to control the optical power, and adjust a bias current of a laser included in an electrical-to-optical converter to control the CNR and the size of a nonlinear component.

8. A control apparatus for monitoring an analog optical link, the control apparatus comprising:
   two or more optical signal monitors configured to monitor uplink and downlink optical signals in the ring network; and
   a system controller configured to control a path of the uplink and downlink optical signals based on a result of the monitoring,
   wherein the optical signal monitor is configured to convert, to an electrical signal, a part of optical power of the uplink and downlink optical signals, and calculate at least one of an average optical power and a carrier-to-ratio (CNR) from the electrical signal.

9. The control apparatus of claim 8, wherein the optical signal monitor is further configured to calculate a size of a nonlinear component from the electrical signal.

10. The control apparatus of claim 8, wherein the system controller is configured to in response to the optical signal monitor identifying a failure occurrence in an optical fiber cable among a plurality of optical fiber cables connecting two or more digital units (DUs), perform a path switching to control transmission paths of two or more radio units (RUs) to avoid the optical fiber cable with the failure.

11. A control method of monitoring an analog optical link, the control method comprising:
   monitoring an optical signal passing through an optical fiber cable; and
   controlling the optical signal based on a result of the monitoring,
   wherein the monitoring of the optical signal passing through the optical fiber cable comprises:
   converting, to an electrical signal, a part of optical power of uplink and downlink optical signals; and
   calculating at least one of an average optical power and a carrier-to-noise ratio (CNR) from the electrical signal.

12. The control method of claim 11, wherein the monitoring of the optical signal passing through the optical fiber cable further comprises:
   calculating a size of a nonlinear component from the electrical signal.

13. The control method of claim 12, wherein the calculating of the average optical power, the carrier-to-noise ratio (CNR), and the size of the nonlinear component from the electrical signal comprises:
   measuring a power of the electrical signal to calculate the average optical power.

14. The control method of claim 12, wherein the calculating of the average optical power, the carrier-to-noise ratio (CNR), and the size of the nonlinear component from the electrical signal comprises:
   acquiring a size and noise size thereof from the electrical signal through an analysis of a frequency domain signal by using a fast Fourier transform (FFT); and
   calculating the CNR and the nonlinear component based on the acquired size and noise size.

15. The control method of claim 11, wherein the controlling of the optical signal based on the result of the monitoring comprises:
   checking a quality of the optical signal based on an optical power, a CNR, and a size of a nonlinear component, which are calculated by the optical signal monitor, and controlling the optical signal so that the checked quality meets a preset standard.

16. The control method of claim 15, wherein the controlling of the optical signal based on the result of the monitoring comprises:
   amplifying or attenuating the electrical signal to adjust an optical modulation index (OM) of an output optical signal to control the optical power; and
   adjusting a bias current of a laser included in an electrical-to-optical converter to control the CNR and the size of a nonlinear component.

17. The control method of claim 11, wherein the monitoring of the optical signal passing through the optical fiber cable comprises:
   calculating a performance of a digital signal by using an equation of CNR(dB)=−20 log 10(EVM/100%), wherein CNR refers to the CNR of the acquired optical signal, and EVM refers to an error vector magnitude and a performance of a modulated digital signal.

* * * * *